Patented Feb. 22, 1949

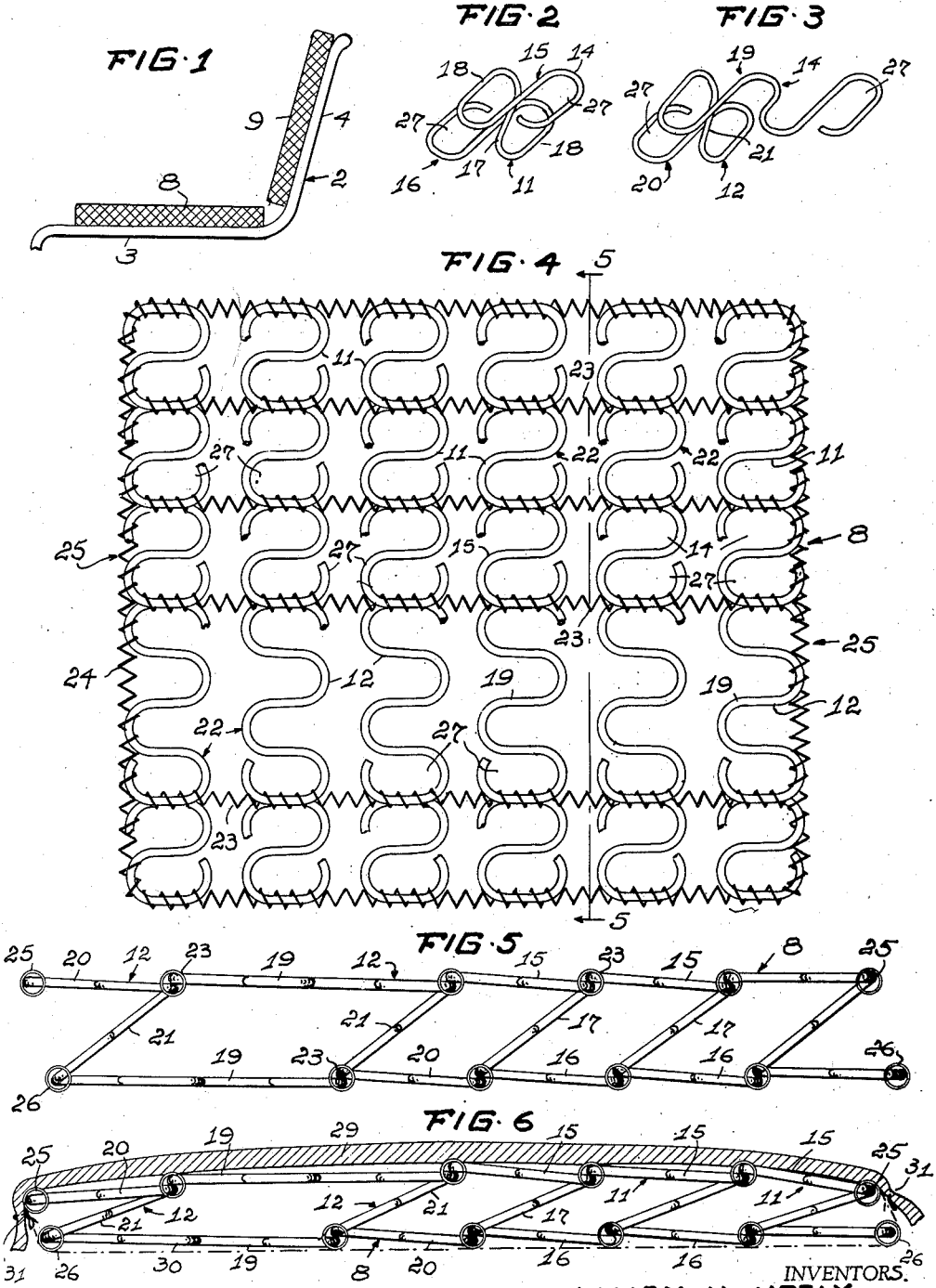

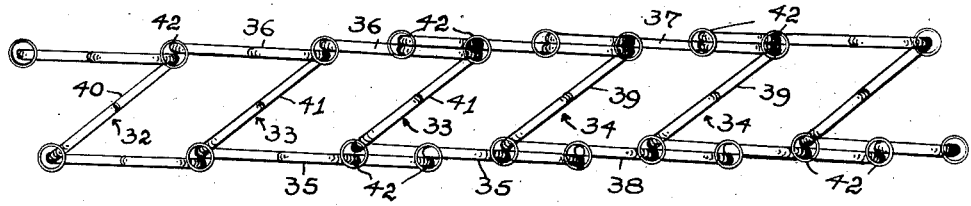
FIG. 7
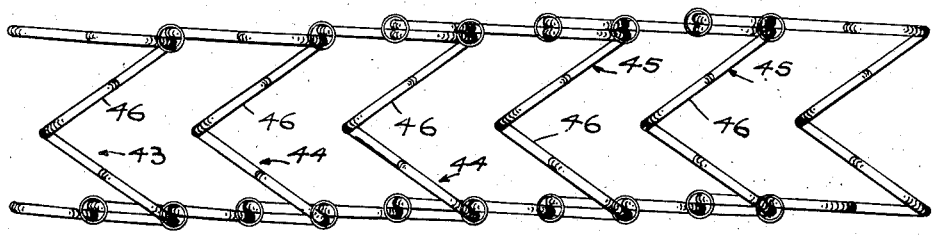
FIG. 8
FIG. 9 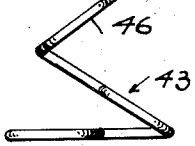 FIG. 10 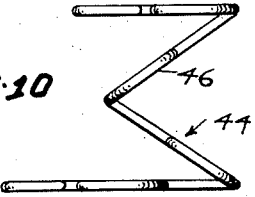
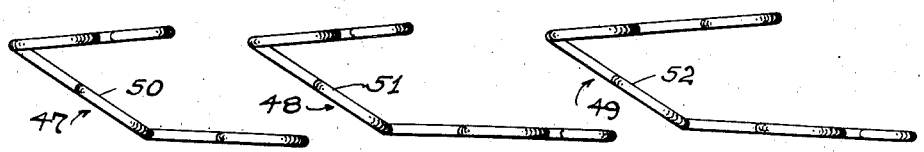
FIG. 11
FIG. 12  FIG. 13  FIG. 14

2,462,539

UNITED STATES PATENT OFFICE 2,462,539

WIRE SPRING STRUCTURE FOR SEAT AND BACK CONSTRUCTIONS

William H. Neely, Cleveland, and Svend G. Blumensaadt, Beachwood Village, Ohio, assignors to The Universal Wire Spring Company, Cleveland, Ohio, a corporation of Ohio Application April 13, 1945, Serial No. 588,146

5 Claims. (Cl. 155—179)

1

This invention is a continuation in part of our pending application Ser. No. 437,550 filed April 3, 1942, which has become Patent No. 2,373,775 on April 17, 1945, and relates in general to wire spring constructions for cushioned seat and back structures in vehicles and the like, and more particularly to spring constructions embodying individual spring elements interconnected with each other to form a readily yielding spring unit.

The general object of the present invention is the provision of a simplified spring unit of the type referred to above, which unit embodies overlapping short zigzag-shaped corrugated wire springs including substantially parallel top and bottom portions and inclined supporting and spacing portions interconnecting said top and bottom portions, and which unit provides a spring structure with substantially parallel yielding top and bottom surfaces yieldingly spaced from each other by the inclined yielding supporting and spacing portions of the springs.

Another object of the invention is the provision of a spring unit assembled from springs of the type referred to above, in which some of the springs have their top and bottom portions arranged adjacent to each other and pivotally connected with each other and in which other springs have their top and bottom portions overlapped and connected to each other at spaced points to stiffen the top and bottom portions of the spring unit in predetermined areas and increase the load resistance in these areas.

In addition, the invention has certain other marked superiorities which radically distinguish it from presently known structures. These improvements or superiorities embodying certain novel features of construction are clearly set forth in the following specification and the appended claims; and several preferred forms of embodiment of the invention are hereinafter shown with reference to the accompanying drawings forming part of the specification.

In the drawings:

Fig. 1 is a sectional view through a front seat structure of a military car embodying a spring seat structure constructed in accordance with the invention;

Fig. 2 is a perspective view of one of the wire springs used in the assembly of the spring seat structure shown in Fig. 1; and Fig. 3 is a perspective view of the other one of the wire springs used in the assembly of the spring seat structure shown in Fig. 1;

Fig. 4 is a plan view of the assembled spring seat structure;

2

Fig. 5 is a sectional view on line 5—5 of Fig. 4; and

Fig. 6 is a sectional view similar to Fig. 5 with the spring seat structure pretensioned and covered with a layer of felt;

Fig. 7 is a sectional view similar to Fig. 5 showing a somewhat modified form of spring seat structure in which some of the springs have their top or bottom portions secured to each other in overlapping relation;

Fig. 8 is a sectional view similar to Fig. 7 in which the spring seat structure is assembled from springs, the top and bottom portions of which are yieldingly spaced from each other by V-shaped spacing and supporting means;

Fig. 9 is a side view of one of the springs used in the assembly of the spring seat structure shown in Fig. 8; and Fig. 10 is a side view of another one of the springs used in the assembly of the spring seat structure shown in Fig. 8;

Fig. 11 is a sectional view similar to Fig. 7 in which the spring seat structure is assembled from substantially U-shaped springs, each of which has its web portion inclined with respect to the top and bottom portions of the spring to provide an inclined spacing and supporting portion between said top and bottom portions;

Fig. 12 is a side view of one of the springs used in the assembly of the spring seat structure shown in Fig. 11;

Fig. 13 is a side view of another one of the springs used in the assembly of the spring seat structure shown in Fig. 11; and Fig. 14 is a side view of still another one of the springs used in the assembly of the spring seat structure shown in Fig. 11.

Referring now in detail to the drawings, Fig. 1 shows the frame structure 2 of a front seat of a military car. This frame structure which embodies a seat portion 3 and a back rest 4 supports and mounts spring structures 8 and 9 of substantially the same construction which are preferably covered with felt, as will be later described. Seat structure 8 embodies Z-shaped corrugated wire springs 11 and 12 of steel wire bent to sinuous shape so that their loops 14 extend in substantially parallel relationship with respect to each other. The wire springs 11 include parallel top and bottom portions 15 and 16 of a length of two loops 14, which portions are integrally interconnected with each other by inclined corrugated spacer and supporting portions 17 of a length of two loops 14. Springs 11 are formed to Z-shape by twisting a corrugated wire of a length of six loops 14 in definite areas which are defined by straight wire portions 18 arranged between adjoining loops 14 so that any deformation of the straight top, bottom and supporting portions of springs 11 are avoided. The wire springs 12 are constructed similar to springs 11, with the exception that top and bottom portions 19 and 20 of springs 12 differentiate in length, one of said portions having a length of four loops 14 and the other one a length of two of such loops, that is a length equal to the length of the inclined corrugated spacer and supporting portions 21 of springs 12. This arrangement permits of different distribution of spacer and supporting portions in spring structures by combining springs 11 and 12 in any desirable manner, as will best be understood from inspection of Figs. 4 through 6, showing a spring unit in which the spacer and supporting portions 17 and 21 are differently spaced from each other at the front and rear of the unit.

Springs 11 and 12 are placed in alignment to form a plurality of elongated spring rows 22 which are laterally spaced from each other and extend from the front to the rear of spring structure 8. When so placed, the springs have the free ends of their top portions 15 and 19, respectively, rested upon the upper ends of inclined spacer and supporting portions 17 and 21 of adjacent springs, an arrangement which insures proper load resistance of the supporting surface of spring structure 8. Springs 11 and 12, and the spring rows 22 formed therefrom, are connected with each other and locked against lateral movement with respect to each other by elongated wire spirals 23 which encircle the overlapping portions of adjoining springs and extend across all spring rows 22. These spiral wires have a pitch proportionated to the shape and dimension of the corrugations of the springs and connect the top and bottom portions of all springs and spring rows to a spring unit 8 which, preferably, is encircled by wire spirals 24 threaded upon the front and sides of the springs adjacent to the edges of spring structure 8 to provide same with top and bottom edge wires 25 and 26. Interlocking of the springs with wire spirals 23 and 24 is facilitated by partly closed end loops 27. The springs 11 and 12 in spring rows 22 of the spring structure 8 control the load resistance of such structure, the front part of which has lower load resistance than its rear part, as spring rows 22 include at their front portions two invertedly arranged springs 12 and as the rear portions of such rows are assembled from springs 11, the short, equally sized top and bottom portions 15 and 16 of which bring about a larger number of supporting and spacing portions in the rear portions of the rows 22. Spring structure 8 is preferably covered with a layer of felt 29 held in position by a burlap or similar lining 30 which is sewed to felt 29 at 31.

Spring seat structures of the type disclosed in Figs. 4 through 6 include a pivotal connection on the individual springs and therefore readily shape themselves to the form of their supporting members. These spring seat structures therefore are particularly suited for cushion constructions supported either on solid panels or a base spring construction.

Spring seat structures of this type may also readily be adapted for use in present day spring seat constructions in which the spring constructions are directly mounted on open frame structures. In this case, the spring seat structure has the bottom portions of adjoining springs overlapped and secured to each other at spaced points to prevent pivotal movement between the springs and form a spring seat structure with resilient supporting members including the bottom portion of some or all of the individual springs of the spring seat construction.

The above described overlapping of portions of the individual springs assembled to a spring seat structure may be applied to the bottom portions and/or the top portions of the springs and permits construction of spring seat structures with predetermined load carrying capacity and predetermined localized load resistance in the seating surfaces of the spring seat structure.

Spring seat structures of this latter type are disclosed in Figs. 7 through 14, showing different types of individual springs assembled to spring seat structures in which top and/or bottom portions of adjoining springs are secured to each other in overlapping relation with respect to each other.

The spring seat structure shown in Fig. 7 is assembled from Z-shaped springs 32, 33 and 34. Springs 32 are identical with springs 11, see Fig. 2, springs 33 include bottom portions 35 one coil longer than their top portions 36, and springs 34 have equal top and bottom portions 37, 38 connected by spacing and supporting member 39 equal in length to the spacing and supporting members 40 and 41 of springs 32 and 33 and shorter than said top and bottom portions.

The thus described springs 32, 33 and 34 are connected with each other by elongated wire spirals 42 which pivotally couple springs 32 with each other and couple springs 32 and 33, and springs 33 and 34 at spaced points, so that springs 32 and 33 and springs 33 and 34 are substantially rigidly connected with each other. A thus constructed spring seat structure embodies in its top and/or bottom portions reenforced areas arranged in predetermined locations and may be provided with reenforced bottom portions throughout to permit mounting of the spring seat structure on open frame constructions.

The spring seat structure disclosed in Fig. 8 is similar to the structure of Fig. 7 and assembled from springs 43, 44 and 45 with substantially parallel top and bottom portions connected by V-shaped spacing and supporting members 46. Spring seat structures assembled from this latter type of springs have more depth and are generally used for furniture construction.

The spring seat structure shown in Fig. 11 is assembled from substantially U-shaped springs 47, 48 and 49 with web portions 50, 51, 52 inclined with respect to the adjoining spring portions. When assembled to a spring structure the web portions of these substantially U-shaped springs form inclined spacing and supporting members between the top and bottom portions 53 and 54 of the spring structure. Preferably, as shown, the flange portion of the substantially U-shaped springs slightly diverge from each other to permit overlapping of the springs when assembled to a spring structure and secured to each other by elongated wire spirals.

Having thus described our invention, what we claim is:

1. A wire spring construction including a plurality of sinuously corrugated wire springs having substantially parallel top and bottom portions and inclined spacing and supporting portions connected with said top and bottom portions, said springs being assembled in rows, and some of the springs of said rows having their parallel portions overlapping each other a full loop of their corrugations and the overlapping portions secured to each other at spaced points to provide a spring structure with stiffened parallel portions yieldingly spaced from each other by the spacing and supporting members of said springs.

2. A wire spring construction as described in claim 1, wherein the wire springs have their top and bottom portions connected by V-shaped supporting and spacing portions integrally extended from said top and bottom portions.

3. A wire spring construction as described in claim 1, wherein the wire springs include top and bottom portions connected at one side by inclined web portions so that these web portions form inclined supporting and spacing portions connecting and spacing the substantially parallel top and bottom portions of the spring structure.

4. A wire spring construction including a plurality of wire springs shaped from sinuously corrugated wire bent to form springs with substantially parallel top and bottom portions and inclined spacing and supporting portions connecting and spacing said top and bottom portions, said springs being assembled in rows and the bottom portions of said springs overlapping each other a full loop of their corrugations, and means securing said overlapping portions at spaced points to each other to provide an elongated spring structure with a substantially stiffened base member.

5. A wire spring construction including a plurality of wire springs shaped from sinuously corrugated wire bent to form springs with substantially parallel top and bottom portions spaced from each other by resilient spacing and supporting portions, said springs being aligned in rows in which the top portions of the springs are arranged adjacent to each other and pivotally connected with each other, and said springs having elongated bottom portions arranged in said rows so as to overlap each other a full loop of their corugations, and means securing said overlapping portions at spaced points to each other to provide a spring construction with a soft, readily yielding top member and a beam-like, less yielding bottom member.

WILLIAM H. NEELY.
SVEND G. BLUMENSAADT.

REFERENCES CITED

The following references are of record in the file of this patent:

UNITED STATES PATENTS

| Number | Name | Date |
|---|---|---|
| 593,739 | Crowley | Nov. 16, 1897 |
| 2,341,015 | Blumensaadt | Feb. 8, 1944 |
| 2,373,775 | Neely et al. | Apr. 17, 1945 |